United States Patent
Zillmann

(10) Patent No.: US 6,915,671 B2
(45) Date of Patent: Jul. 12, 2005

(54) APPARATUS FOR LOCKING A MOTOR-VEHICLE STEERING SHAFT

(75) Inventor: Horst Zillmann, München (DE)

(73) Assignee: Huf Hulsbeck & Furst GmbH & Co KG, Velbert (DE)

( * ) Notice: Subject to any disclaimer, the term of this patent is extended or adjusted under 35 U.S.C. 154(b) by 0 days.

(21) Appl. No.: 10/682,208

(22) Filed: Oct. 10, 2003

(65) Prior Publication Data

US 2004/0074266 A1 Apr. 22, 2004

(30) Foreign Application Priority Data

Oct. 14, 2002 (DE) .................................. 102 47 802

(51) Int. Cl.$^7$ .................................. B60R 25/02
(52) U.S. Cl. .................................. 70/186; 70/252
(58) Field of Search .................. 70/182–186, 252, 70/278.7, 280–282; 292/144, 150

(56) References Cited

U.S. PATENT DOCUMENTS

| | | | | |
|---|---|---|---|---|
| 4,427,967 A | * | 1/1984 | Maiocco ...................... | 340/457 |
| 4,466,262 A | * | 8/1984 | Maiocco et al. ............... | 70/252 |
| 4,685,313 A | * | 8/1987 | Neyret ......................... | 70/186 |
| 6,354,117 B1 | * | 3/2002 | Canard ......................... | 70/186 |
| 6,354,118 B1 | * | 3/2002 | Frick et al. ................... | 70/186 |
| 6,439,011 B1 | * | 8/2002 | Frick et al. ................... | 70/185 |
| 6,508,088 B1 | * | 1/2003 | Barbier et al. ................ | 70/186 |
| 6,543,262 B2 | | 4/2003 | Limburg et al. .............. | 70/186 |
| 6,647,751 B2 | | 11/2003 | Zillmann ..................... | 70/186 |
| 6,675,673 B2 | * | 1/2004 | Starken ....................... | 74/527 |
| 2002/0069683 A1 | * | 6/2002 | Bartels et al. ................ | 70/186 |

FOREIGN PATENT DOCUMENTS

| | | |
|---|---|---|
| DE | 1780563 | 9/1971 |
| DE | 3131558 | 2/1983 |
| DE | 9208698.5 | 1/1993 |
| DE | 4436326 | 10/1995 |
| DE | 19653860 | 2/1998 |
| DE | 10022831 | 12/2001 |
| DE | 10041984 | 2/2002 |
| DE | 10103182 | 8/2002 |
| EP | 1176065 | 1/2002 |
| GB | 2298229 | 8/1996 |

* cited by examiner

Primary Examiner—Lloyd A. Gall
(74) Attorney, Agent, or Firm—Bacon & Thomas, PLLC

(57) ABSTRACT

Apparatus to lock a motor-vehicle steering shaft against rotation using a locking bolt axially reciprocable by a to-and-fro rotatable control element between a locked position and a release position, the bolt being fixable in its locked position by a displaceably supported, spring-loaded securing element driven by the spring load into a lateral recess of the locking bolt and which cooperates with the control element of the locking bolt in order to be moved out of the lateral recess against the action of the spring load. The control element is rotatable about an axis running parallel to the locking bolt's longitudinal axis. The securing element comprises an axially displaceable securing pin the longitudinal axis of which runs in a plane perpendicular to the locking bolt's longitudinal axis and which by its spring load rests against a control surface of the control element that extends around the axis of rotation of the control element.

16 Claims, 15 Drawing Sheets

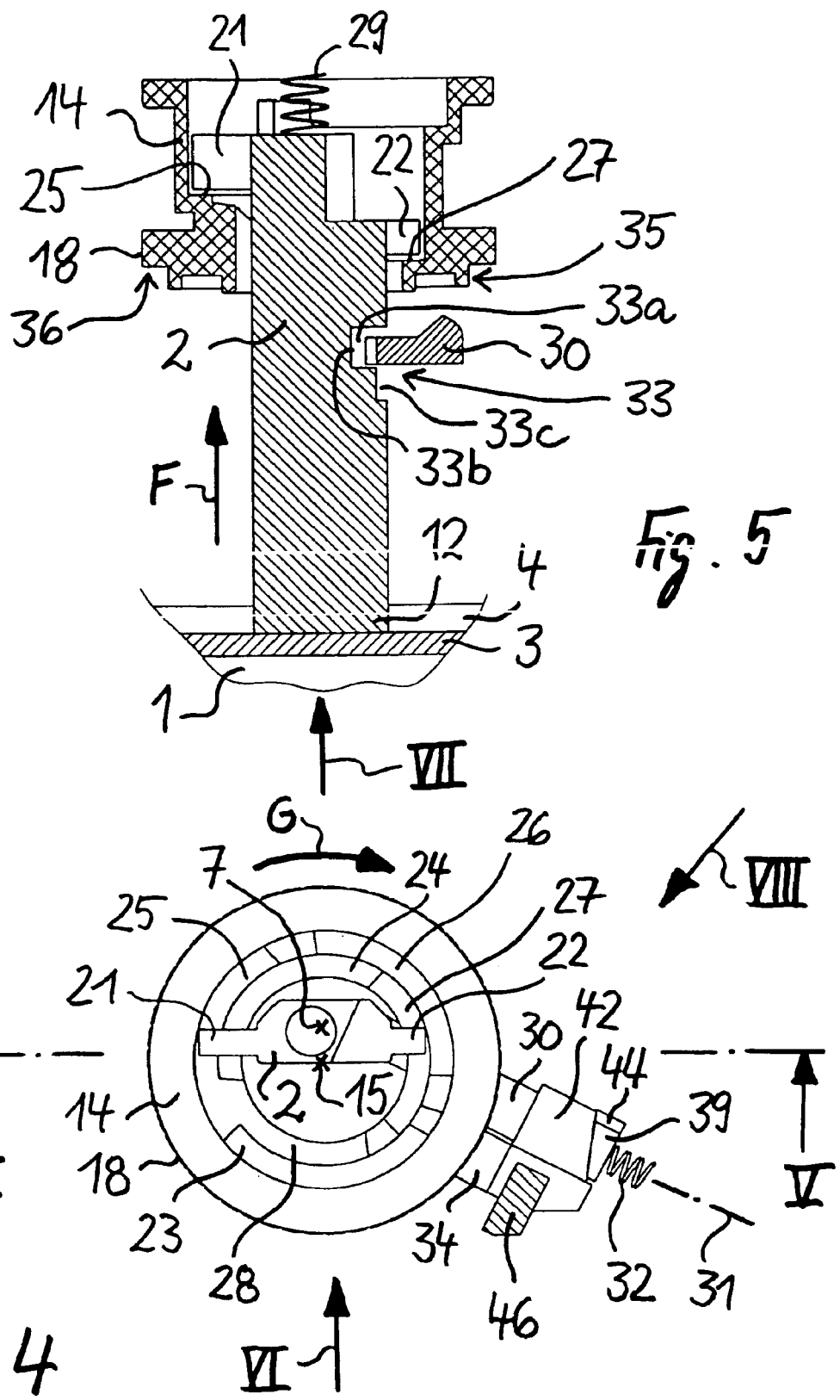

APPARATUS FOR LOCKING A MOTOR-VEHICLE STEERING SHAFT

BACKGROUND OF THE INVENTION

1. Field

The present invention relates to an apparatus for locking the steering shaft of a motor-vehicle against rotation, using a locking bolt which can be axially reciprocated within a housing by a to-and-fro rotatable control element between a locked position and a release position. The locking bolt is fixed in the locked position by means of a spring-loaded securing element displaceably supported in the housing that, on account of the spring load, enters a lateral recess of said locking bolt, and that, to be moved out of said recess against the spring load applied to it, cooperates with the control element for the locking bolt.

2. Related Art

Such apparatus for irrotationally locking motor-vehicle steering shafts are known (German publication 1,780,563; British publication 2,298,229 A; German patent 196 53 860 C1). The control element driving the locking bolt in these devices is a control cam pivotable to-and-fro about an axis perpendicular to the locking bolt's longitudinal axis, the control cam co-operating through an eccentric with the locking bolt and being driven by a key-actuated locking cylinder coaxial with the control cam's pivot axis (German publication 1,780,563; British publication 2,298,229 A) or by a reversible electric motor (German patent 196 53 860 C1). The securing element fixing the locking bolt in its locked position against unauthorized displacement into its release position, so that the motor-vehicle steering shaft may be rotated, is constituted by a single-arm lever which is pivotably supported at one end about an axis extending parallel to the locking bolt's longitudinal axis (German publication 1,780,563 FIGS. 1 through 6) or an axis parallel to the pivot axis of the control cam (British publication 2,298,229 A; German patent 196 53 860 C1) while being spring loaded in order to enter at its other end the lateral recess of the locking bolt, and comprising between its two ends a lateral arm resting against the control cam in order to be pivoted against the spring load out of the locking bolt's recess when the control cam is pivoted to drive the locking bolt out of the locked position into the release position.

Moreover, it is known in the art related to apparatus for locking a motor vehicle steering shaft against rotation by means of a locking bolt which is axially displaceable in a housing to-and-fro between a locked position and a release position, to fix said locking bolt in its locked position using a spring-loaded securing pin axially displaceable within said housing and cooperating with a lateral recess of the locking bolt when part of the housing is broken off. The securing pin is supported by a retaining wire or retaining pin axially displaceable in the housing parallel to the locking bolt against the spring load on said securing pin, said wire or pin cooperating at its end located away from the securing pin with the locking cylinder driving the locking bolt or with the control cam controlling the locking bolt and connected to the locking cylinder's core in order to move axially and to release the securing pin in the event the housing part enclosing the locking cylinder and possibly enclosing the control cam is broken off, whereby, on account of its spring load, the securing pin will engage the lateral recess of the locking bolt (German patent 31 31 558 C1; German utility model 92 08 698 U1). Alternatively, the securing pin is supported against its spring load by a retaining arm projecting from the housing in the inside thereof and releasing the securing pin to enter the lateral recess of the locking bolt due to said spring load when the housing part fitted with the retaining arm is removed (German publication 100 41 984 A1).

BRIEF SUMMARY OF THE INVENTION

The object of the present invention is to provide an apparatus of the above-stated kind which, in simple manner and for a special arrangement of the control element with respect to the locking bolt, always assures reliably fixing of the locking bolt in its locked position so that the locking bolt cannot be moved out of said locked position either by bumps or by means of a magnet or in other ways without authorization, and which, further allows to prevent in a simple manner to release the fixing of the locking bolt in its locked position by unauthorized removal of the sealing lid of an assembly aperture in the housing.

The present invention is especially applicable to locking apparatus for motor-vehicle steering shafts of the kind as e.g. disclosed in German patent 101 09 609 C1.

DESCRIPTION OF THE DRAWINGS

Two embodiments of the present invention to lock a motor vehicle steering shaft are elucidated below in relation to the appended drawings, wherein:

FIG. 4 is a top view corresponding to that of FIG. 2 showing only the locking bolt, the control element and the securing pin of the locking bolt, the sensor element cooperating with the securing pin and the arm of the lid of the housing assembly aperture engaging the sensor element, FIG. 5 is a section view along line V—V of FIG. 4, also showing the associated steering shaft.

DETAILED DESCRIPTION OF THE PREFERRED EMBODIMENTS OF THE INVENTION

Figure 1:
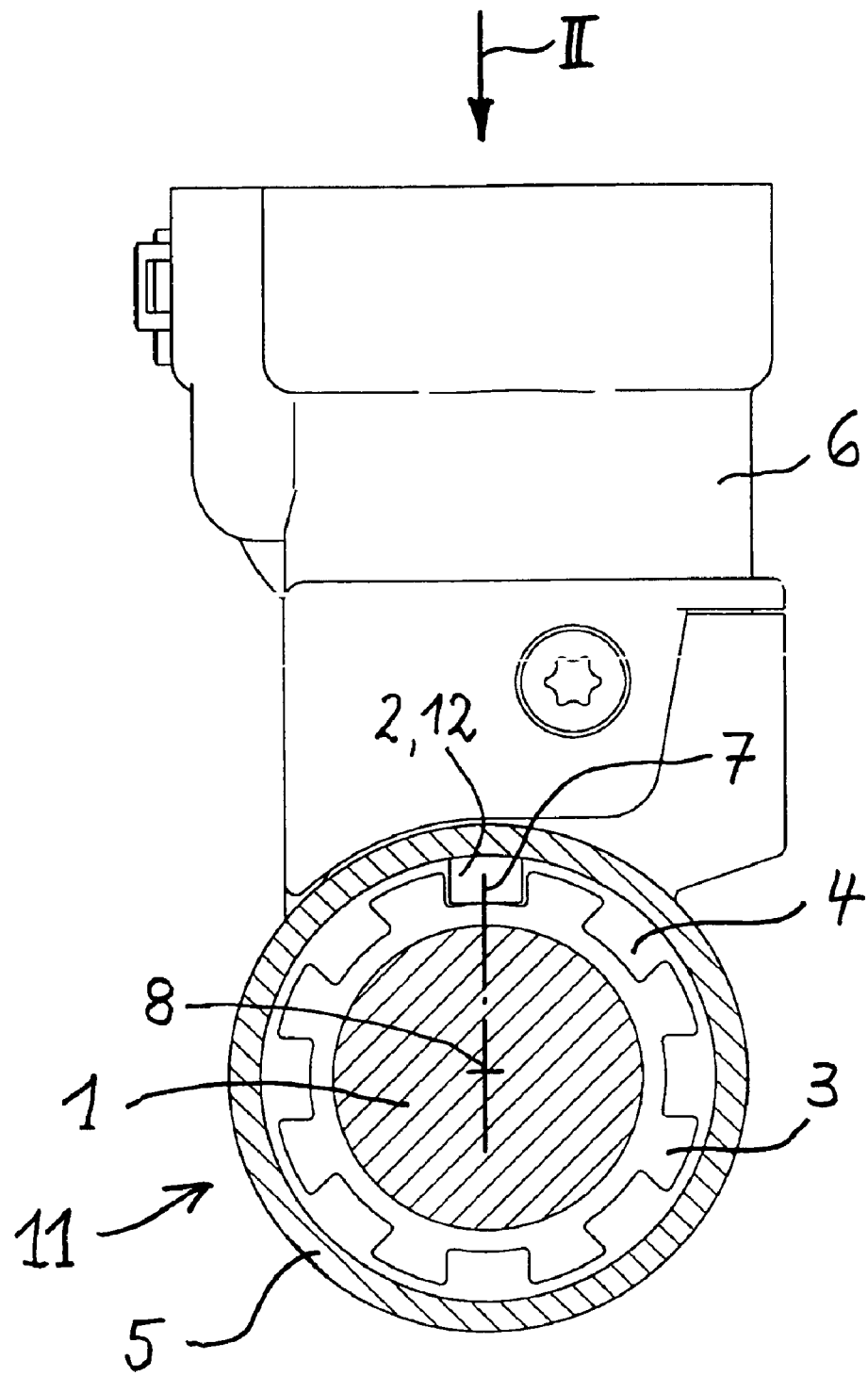
FIG. 1 is an elevation view in the direction of the arrow I of FIG. 2 of a first embodiment, showing the locking bolt being in its locked position.

The apparatus shown in FIGS. 1 through 18 for locking a motor-vehicle steering shaft 1 against rotation comprises a locking bolt 2 cooperating with a locking sleeve 3 which is affixed to the steering shaft 1 and is fitted with locking grooves 4. The steering shaft 1 and the locking sleeve 3 are enclosed by a casing tube 5 having a passage opening (not shown) for the locking bolt 2.

The locking bolt 2 has a substantially rectangular cross-section and is axially displaceable within a cross-sectionally matching duct (not shown) of a housing 6. The longitudinal axis 7 of the locking bolt 2 orthogonally intersects the common longitudinal axis 8 of the steering shaft 1 and of the casing tube 5 coaxial with it. The housing 6 is fitted on its side remote from the steering shaft 1 and the casing tube 5 with an assembly aperture 10 closed by a lid 9 and is affixed to said tube 5, as shown in FIG. 1. The steering shaft 1 and the casing tube 5 constitute the motor vehicle's steering column 11.

The locking bolt 2 is displaceable in a reciprocating manner between, on one hand, the locked position shown in FIGS. 1 through 8, whereat it engages, by its end 12 adjacent to the steering shaft 1 a locking groove 4 of the locking sleeve 3 as a result of which the steering shaft 1 no longer can be rotated and, on the other hand, the release position shown in FIGS. 9 through 12, whereat the end 12 of the locking bolt 2 is not inserted in any locking groove 4 of the locking sleeve 3 so that the steering shaft 1 is released and therefor may be rotated.

Figure 2:
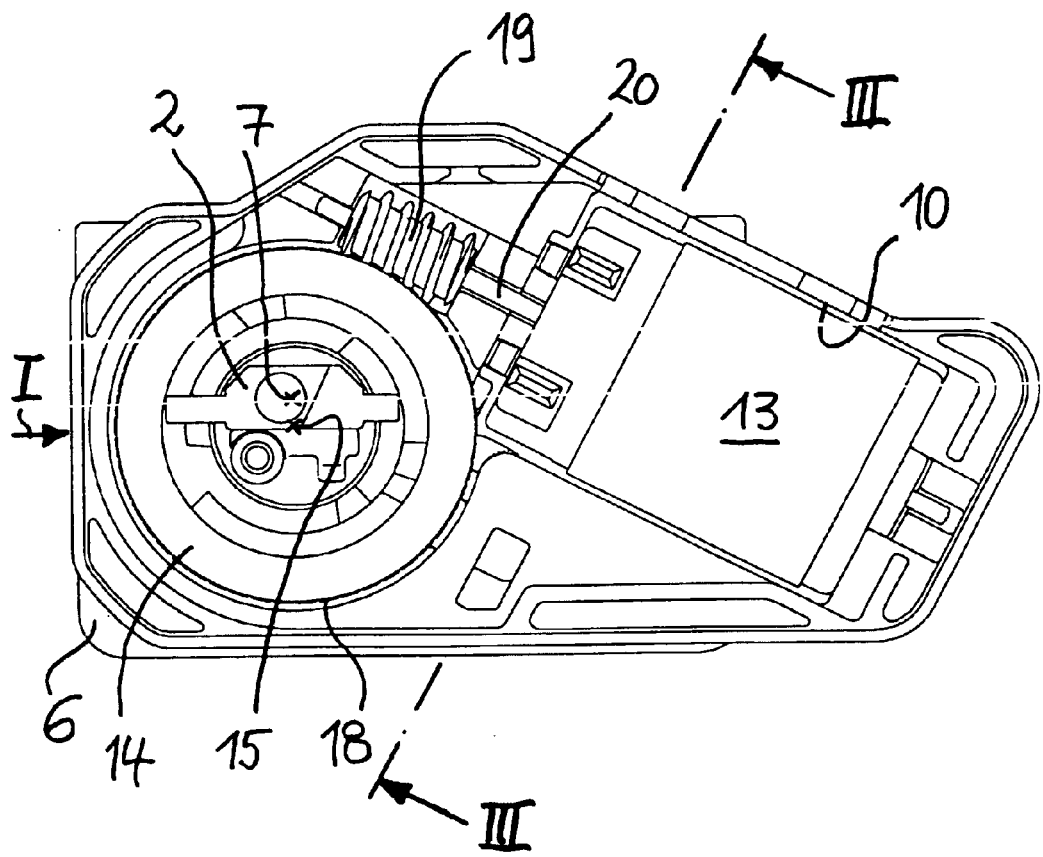
FIG. 2 is a top view in the direction of the arrow II of FIG. 1 without the housing assembly aperture lid and without the associated steering column.
Figure 6:
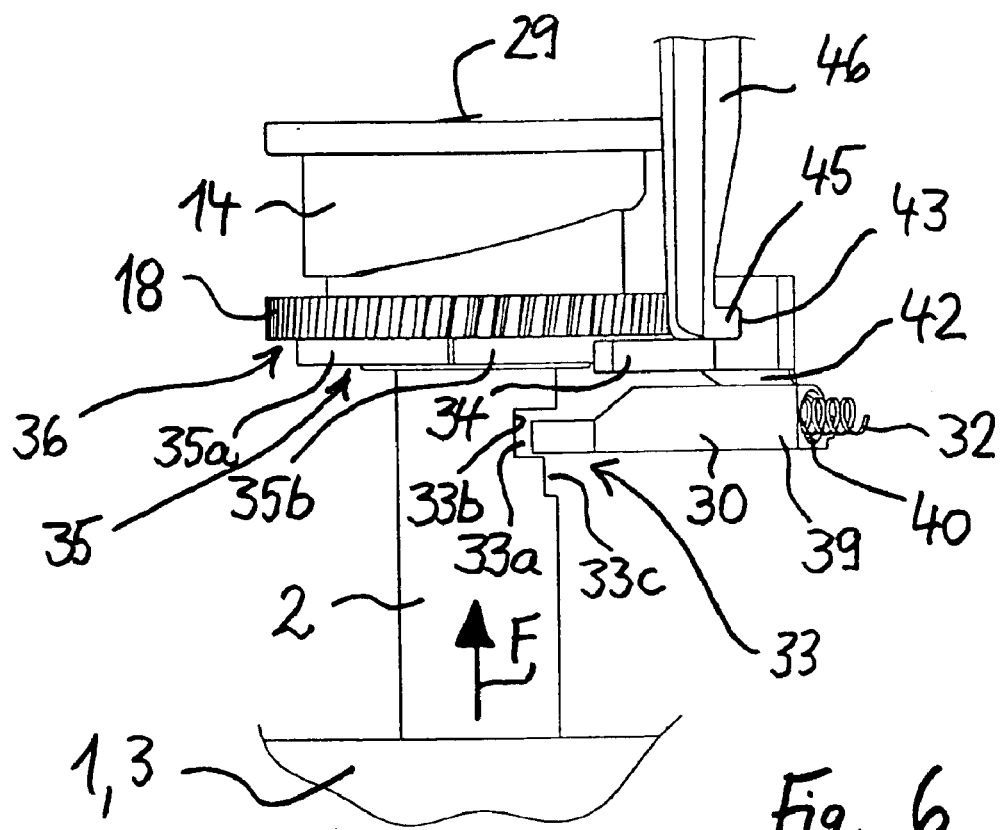
FIG. 6 is an elevation view in the direction of the arrow VI of FIG. 4, also showing the associated steering shaft.
Figure 10:
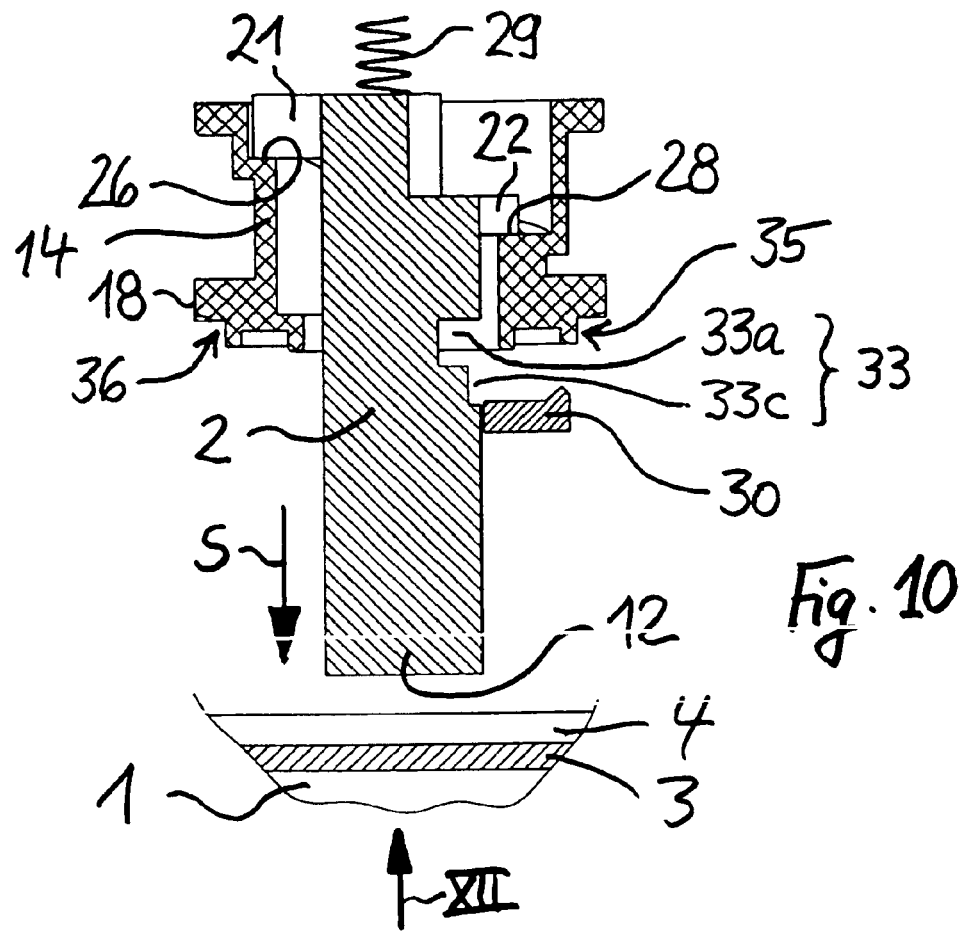
FIG. 10 is a section view along line X—X of FIG. 9, the associated steering shaft also being shown.
Figure 11:
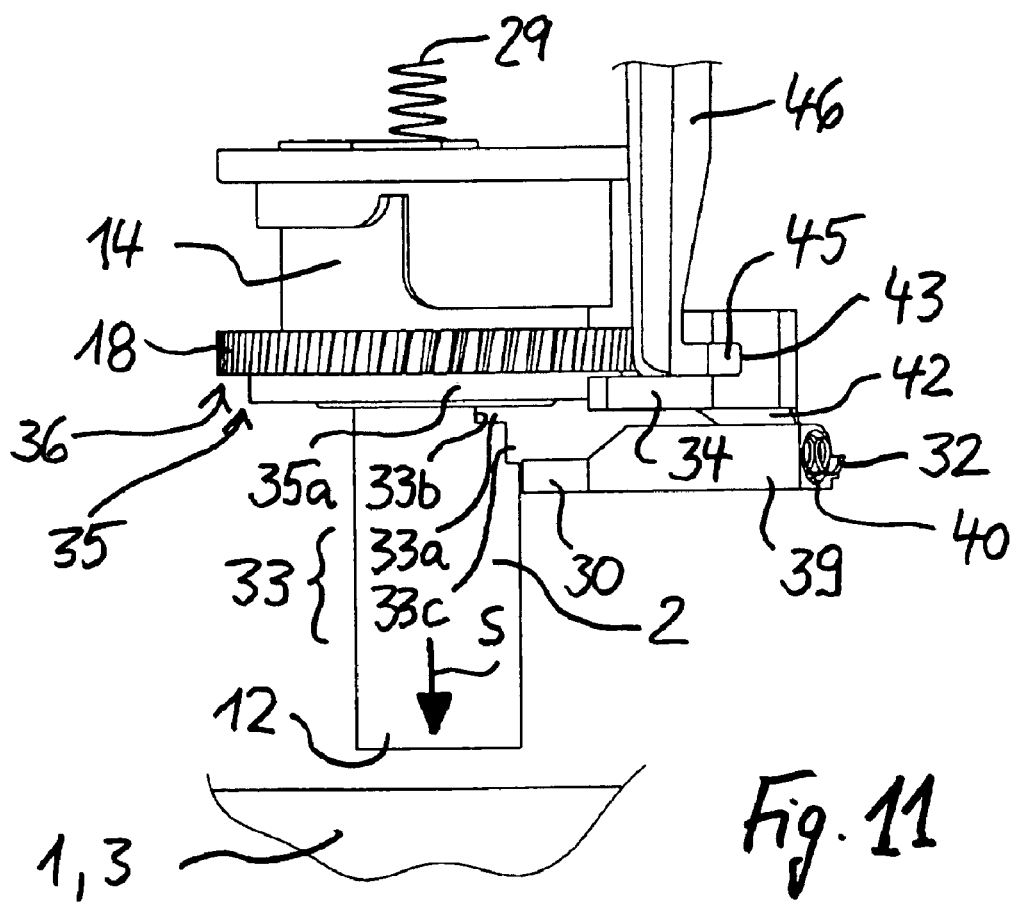
FIG. 11 is an elevation view in the direction of the arrow XI of FIG. 9, the associated steering shaft also being shown.

A to-and-fro rotatable control element 14, itself driven by a reversible electric motor 13, serves to axially drive the locking bolt 2 in a direction indicated by the arrow F in FIGS. 5, 6 into the release position and to axially drive the locking bolt 2 in the opposite direction indicated by the arrow S in FIGS. 10, 11 into the locked position. The control element 14 is arranged substantially coaxially with the locking bolt 2, which it surrounds, and the control element 14 is supported in the housing 6 so as to be rotatable about an axis 15 which is parallel to the longitudinal axis 7 of the locking bolt 2 between an annular surface 16 of the housing 6 which is coaxial with said axis 15 and a ring of inner projections 17 carried by the sealing lid 9 of the assembly aperture 10 of the housing 6 and arranged coaxially with said axis 15. The control element 14 is formed as a tubular worm gear with outer teeth 18 engaged by a worm 19 affixed to the output shaft 20 of the electric motor 13 as indicated in FIG. 2.

The locking bolt 2 is fitted with two external radial protrusions 21, 22 cooperating with two inner oblique surfaces 23, 24 of the control element 14. The two oblique surfaces 23, 24 have the same slope each merging at its two ends into two end surfaces 25, 26 or 27, 28 respectively located in a plane perpendicular to the axis of rotation 15 of the control element 14. A helical compression spring 29 is mounted between the locking bolt 2 and the sealing lid 9 of the assembly aperture 10 of the housing 6 and biases the protrusions 21, 22 of the locking bolt 2 against the oblique surfaces 23, 24 and the end surfaces 25, 26, 27, 28 of the control element 14.

When the locking bolt 2 is in the locked position, the two protrusions 21, 22 each are opposite the associated end surface 25 or 27 of the control element 14 that is nearer the steering shaft 1. When the locking bolt 2 assumes the release position its two protrusions 21, 22 each rest on the associated end surface 26 or 28 of the control element 14 that is farther away from the steering shaft 1. The electric motor 13 is turned ON in order to axially move the locking bolt 2 against the force of the helical compression spring 29 out of the locked position in the direction of the arrow F (FIGS. 5, 6) into the release position and to enable the locking bolt 2 to be axially driven by the helical compression spring 29 from the release position in the direction of the arrow S (FIGS. 10, 11) into the locked position, whereby the electric motor 13 rotates the control element 14 clockwise (arrow G in FIGS. 4,7) or counterclockwise (arrow T in FIGS. 9, 12) and the two protrusions 21, 22 of the locking bolt 2 move over the two oblique surfaces 23, 24 of the control element 14 from the two end surfaces 25, 27 thereof near the steering shaft 1 to the two end surfaces 26, 28 thereof remote from the steering shaft 1 or vice-versa from the two end surfaces 26, 28 thereof remote from the steering shaft 1 to the two end surfaces 25, 27 of the control element 14 which are near the steering shaft 1.

Figure 7:
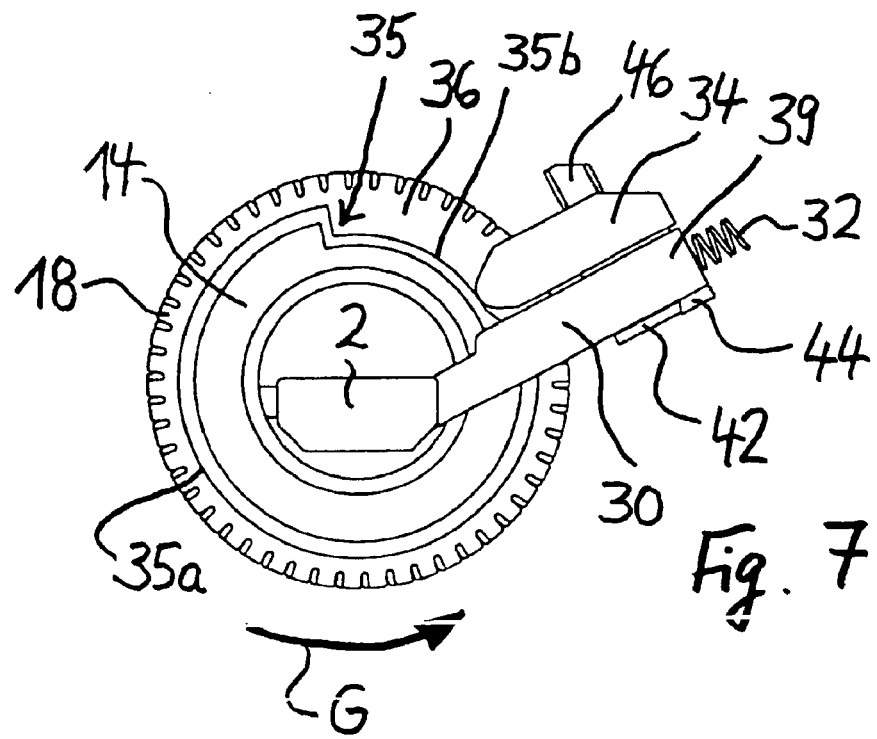
FIG. 7 is a view in the direction of the arrow VII of FIG. 5 of the components of FIG. 4.

The locking bolt 2 is adapted to be fixed in its locked position by a securing pin 30 so that the locking bolt 2 is precluded from being displaced without authorization out of the locked position either by bumps or by means of a magnet or by other forces in the direction of the arrow F (FIGS. 5, 6), but instead may only be moved out of said locked position by rotating the control element 14 in the direction of the arrow G (FIGS. 4, 7). Measures are taken which assure that the fixation of the locking bolt 2 in its locked position by the securing pin 30 cannot be eliminated, i.e. made ineffective when the sealing lid 9 of the assembly aperture 10 of the housing 6 is removed.

The securing pin 30 rests in axially displaceable manner in the housing 6, its longitudinal axis 31 running in a plane perpendicular to the longitudinal axis 7 of the locking bolt 2, namely radially with respect to the longitudinal axis 7 of the locking bolt 2. The securing pin 30 is biased by a helical compression spring 32 in the direction toward the locking bolt 2 so as to engage a lateral recess 33 of the locking bolt 2, and it cooperates through a sensor element 34 with a control surface 35 of the control element 14 in order to be moved against the force of the helical compression spring 32 out of the recess 33 of the locking bolt 2. The control surface 35 extends around the axis of rotation 15 of the control element 14.

The securing pin 30 is mounted between the control element 14 and the steering shaft 1. The control surface 35 for the securing pin 30 is located at that end face 36 of the control element 14 which faces the steering shaft 1.

Figure 3:
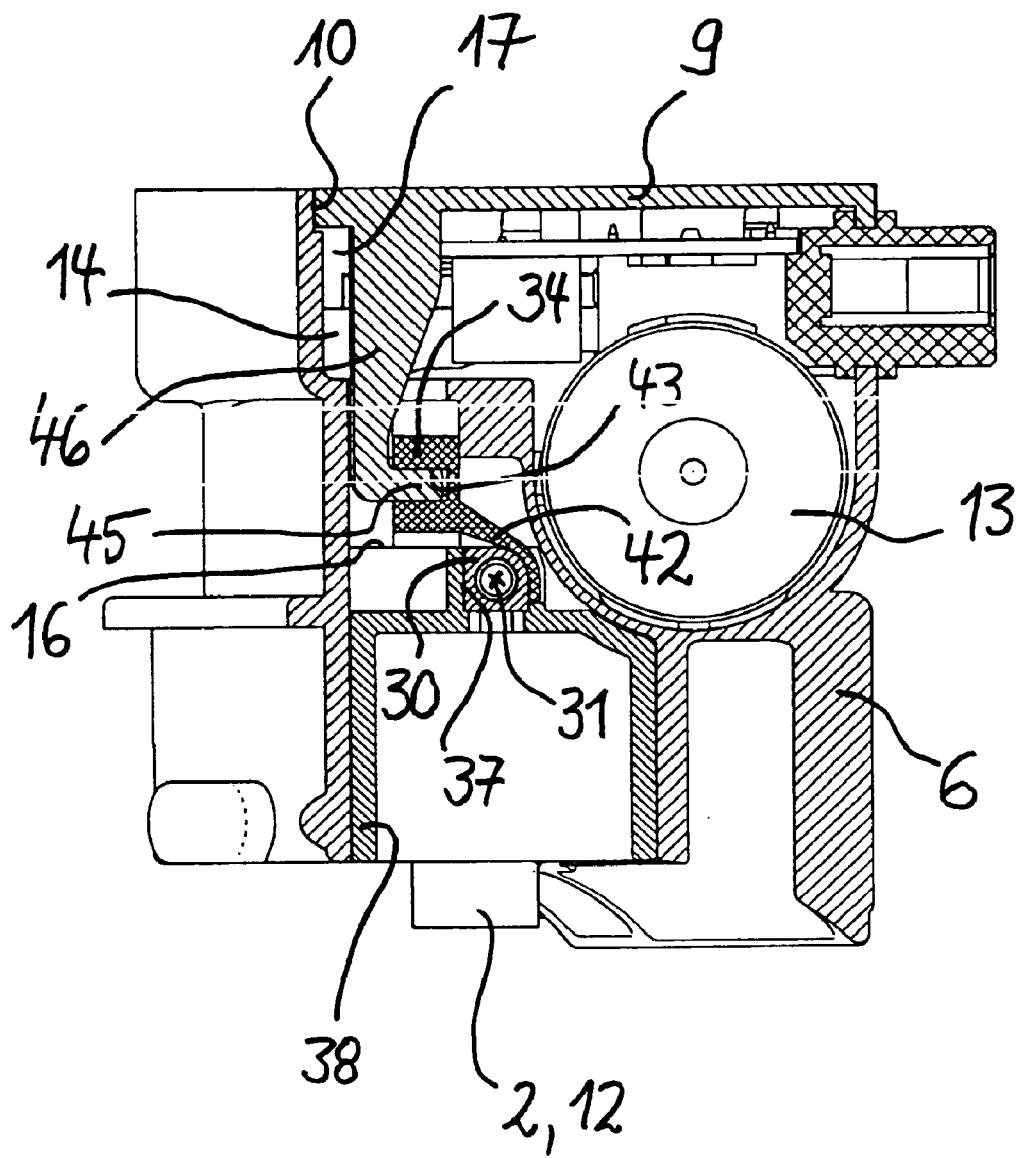
FIG. 3 is a section view along line III—III of FIG. 2 with the lid covering the housing assembly aperture.
Figure 8:
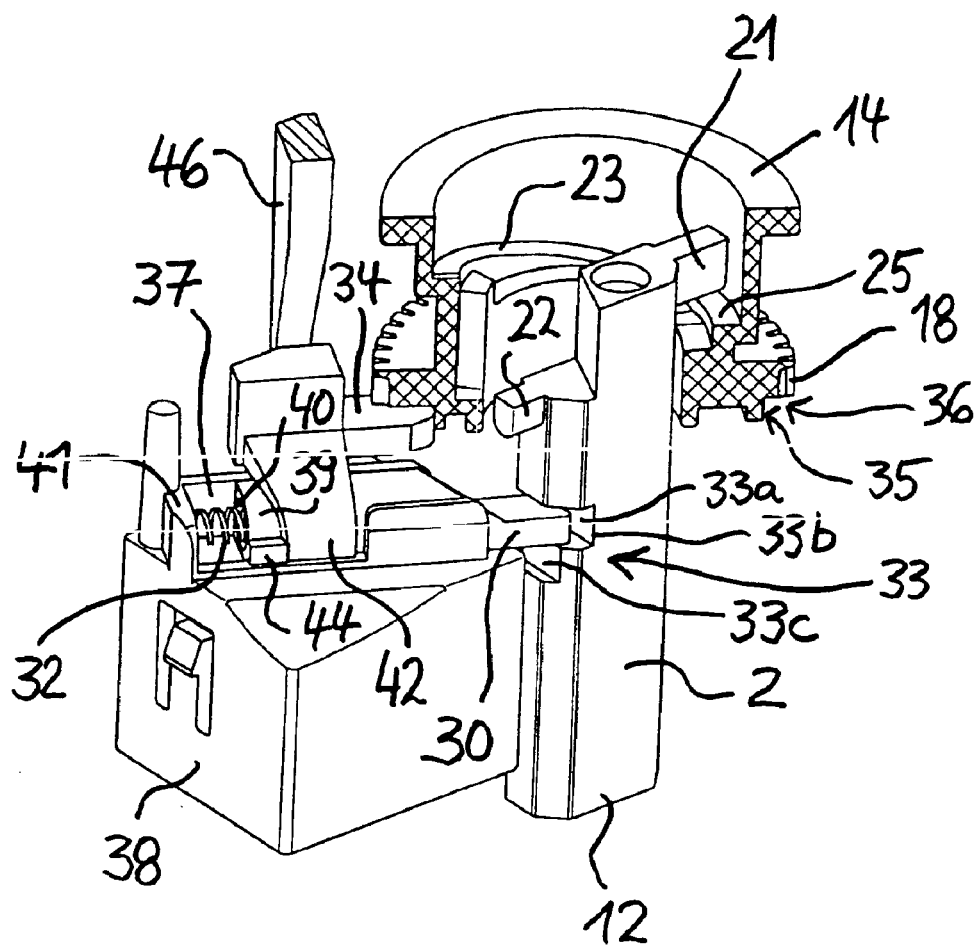
FIG. 8 is a perspective view in the direction of the arrow VIII of FIG. 4, additionally showing the guide element of the securing pin.
Figure 18:
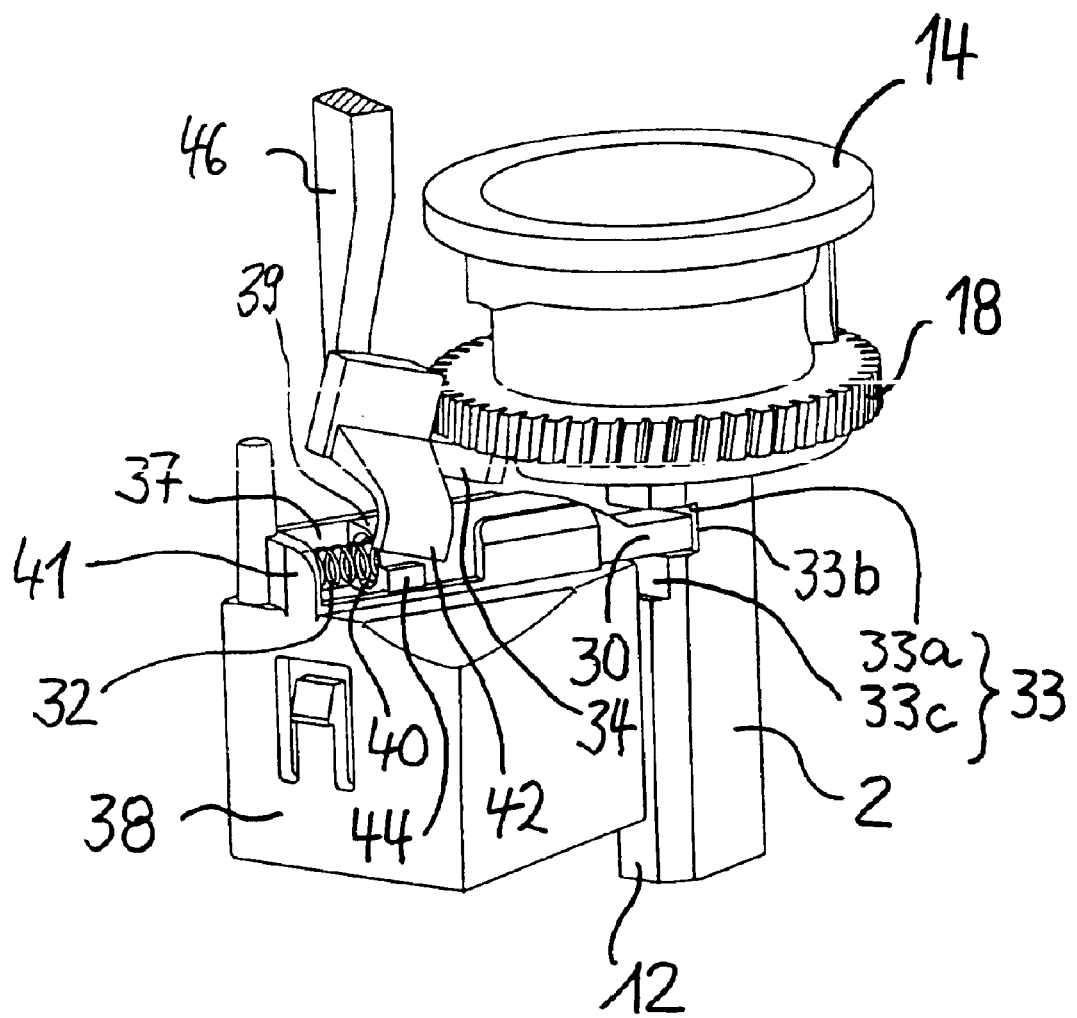
FIG. 18 is a perspective view corresponding to that of FIG. 8, with the housing assembly aperture lid raised.
Figure 20:
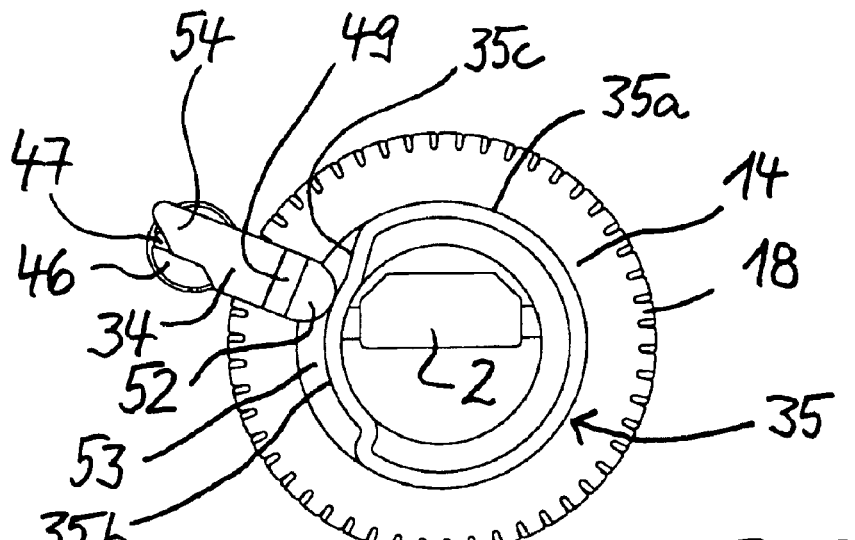
FIG. 20 is a view of the second embodiment corresponding to that of FIG. 7, without the securing pin.

As shown in FIGS. 3, 8, 18, the securing pin 30 is supported in an axially displaceable manner in a channel 37 of a guide element 38 fixed to the housing 6, the associated helical compression spring 32 resting at one end in a blind hole 40 in that end 39 of the securing pin 30 which is located away from the locking bolt 2 and at its other end against a tab 41 of the guide element 38 (FIG. 8), the associated sensing element 34 being mounted parallel to the securing pin 30 and comprising on one side a projecting lateral arm 42 and on the other side a groove 43. By means of the lateral arm 42, the sensor element 34 spans the securing pin 30 on the side away from the guide element 38 while passing behind and engaging a lateral protrusion 44 of the securing pin 30 which is located at the end 39 of the securing pin 30 on the side away from said sensing element 34. The groove 43 of the sensing element 34 runs parallel to the securing pin 30 and is arranged to receive a lateral tab 45 of an inner arm 46—which runs parallel to the locking bolt 2—of the sealing lid 9 of the assembly aperture 10 of the housing 6.

FIGS. 7, 12, 14, 16 show the geometry of the control surface 35 of the control element 14 against which the securing pin 30 is pressed by the helical compression spring 32 through the sensing element 34. The control surface 35 comprises two segments 35a, 35b which are configured coaxially with the axis of rotation 15 of the control element 14 and a transition segment 35c, the coaxial segment 35a being the more distant one from the control element's axis of rotation 15 and subtending a comparatively large central angle, whereas the other coaxial segment 35b is nearer the control element's axis of rotation 15 and subtends a comparatively small central angle, the two coaxial segments 35a, 35b being mutually connected at the ends running past the sensing element 34 when the control element 14 is rotated in either direction (arrow G or T) by the oblique transition segment 35c.

As shown in FIG. 7, the sensing element 34 rests against the control surface's 35 coaxial segment 35b nearer the axis of rotation of the control element 14 when the locking bolt 2 is in its locked position, so that, according to FIG. 6, the securing pin 30 engages the lateral recess 33 of the locking bolt 2, specifically in a deeper segment 33a of latter, yet without extending as far as the end 33b of the recess 33 or its deeper segment 33a.

Figure 12:
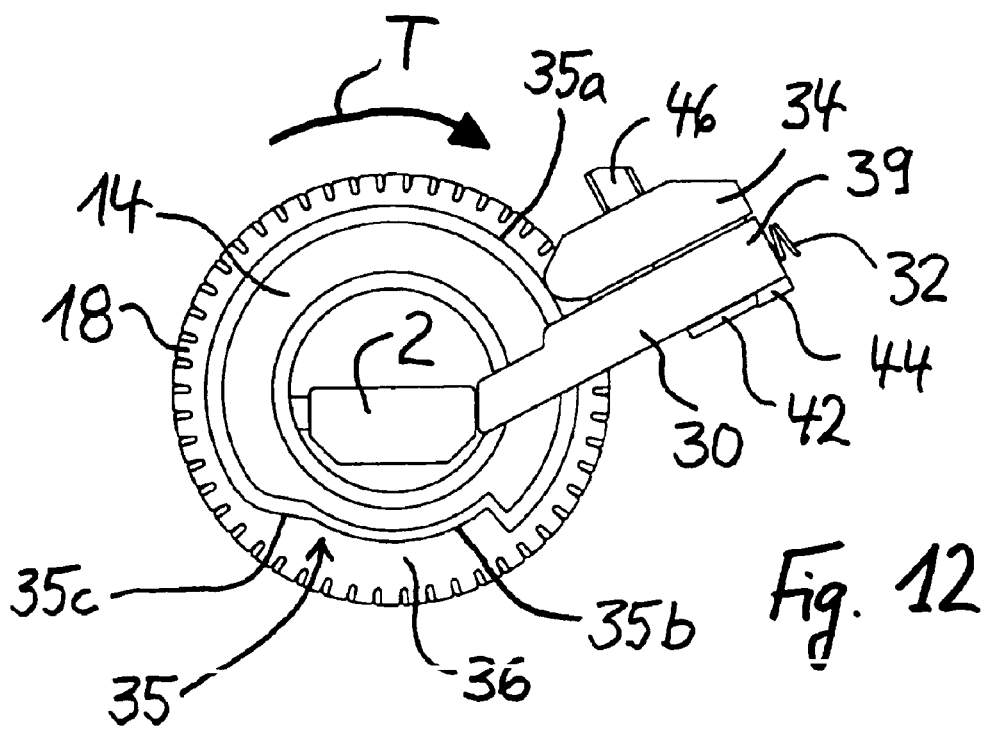
FIG. 12 is a view in the direction of the arrow XII of FIG. 10 of the components of FIG. 9.

In FIG. 12, the sensing element 34 rests against the control surface's coaxial segment 35a farther away from the axis of rotation 15 of the control element 14, when the locking bolt 2 is in its release position, whereby, as shown in FIG. 11, the securing pin 30 is located outside the lateral recess 33 of the locking bolt 2.

Figure 9:
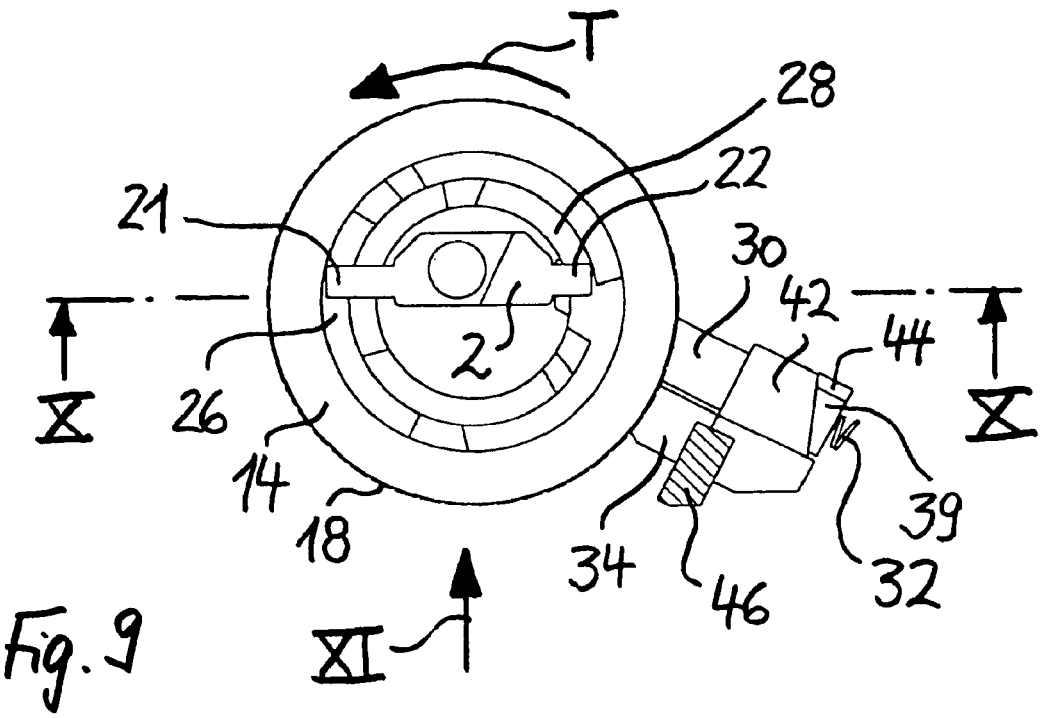
FIG. 9 is a top view corresponding to that of FIG. 4, the locking bolt being in its release position.
Figure 14:
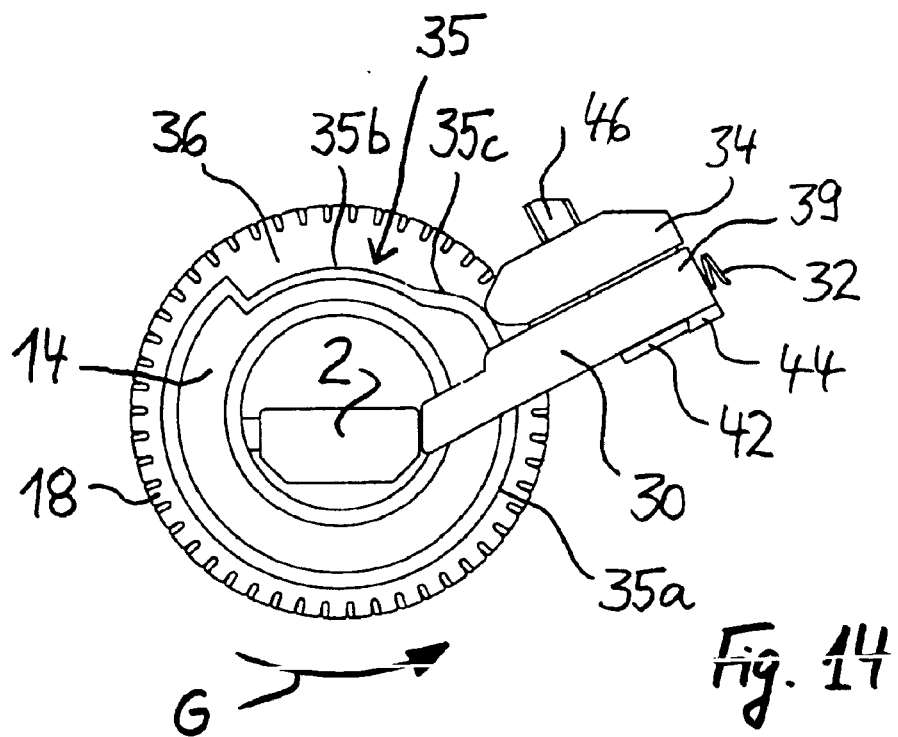
FIG. 14 is a view in the direction of the arrow XIV of FIG. 13 with the steering shaft omitted.
Figure 13:
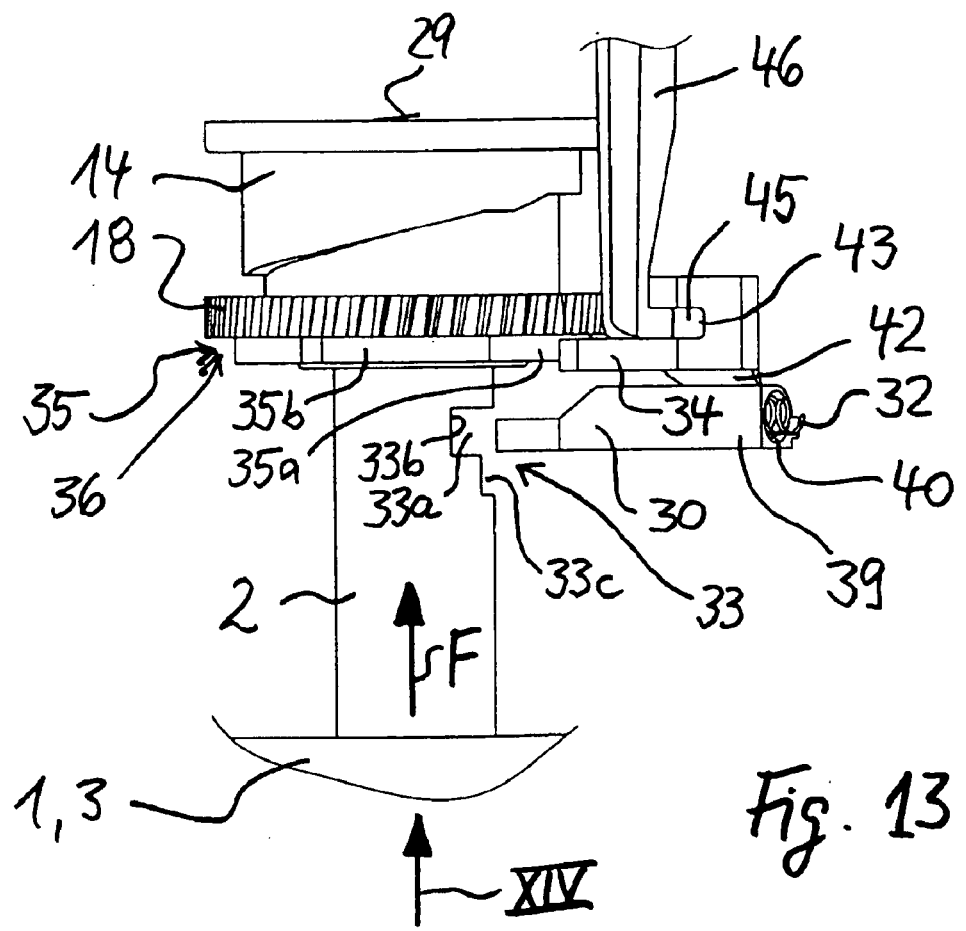
FIG. 13 is an elevation view corresponding to that of FIG. 6, the securing pin having left the lateral recess of the locking bolt.

FIGS. 13, 14 show that the control surface 35 of the control element 14 is arranged in such a way relative to the oblique surfaces 23, 24 of the control element 14 that when the control element 14 is rotated out of the position of FIGS. 4, 7 in the direction of the arrow G, first the securing pin 30 is retracted from the lateral recess 33 of the locking bolt 2, i.e. out of the deeper segment 33a of the latter, namely when the sensing element 34 slides along the transition segment 35c onto the coaxial segment 35a of the control surface 35 of the control element 14, which segment 35a is farther from the axis of rotation 15 of the control element 14, whereupon, and only then, the locking bolt 2 will be axially shifted out of its locked position (FIGS. 5, 6, 13) in the direction of the arrow F into its release position (FIGS. 10, 11), that is when the protrusions 21, 22 of the locking bolt 2 slide along the oblique surfaces 23, 24 of the control element 14 during the rotation thereof in the direction of the arrow G into the position shown in FIGS. 9, 12.

Figure 16:
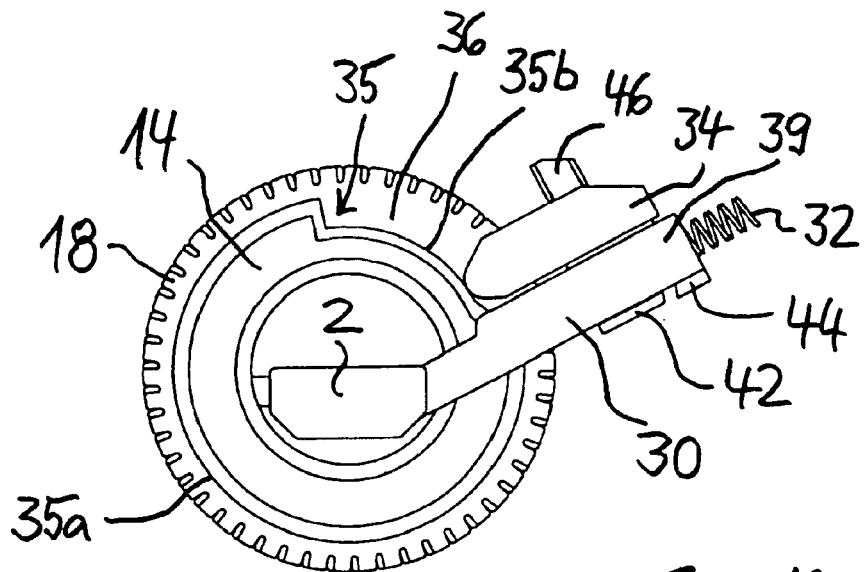
FIG. 16 is a view in the direction of the arrow XVI of FIG. 15 with the steering shaft omitted.
Figure 15:
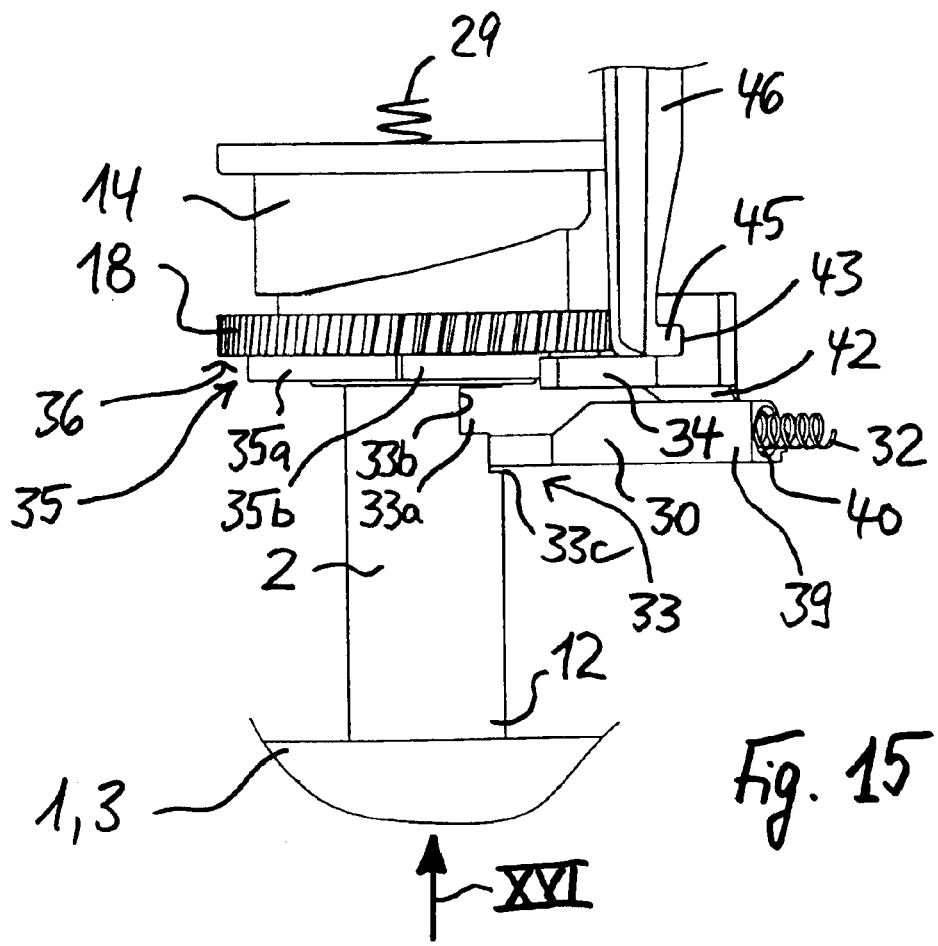
FIG. 15 is an elevation view corresponding to that of FIG. 6 with the locking bolt shown in a pre-locked position.

FIGS. 15, 16 illustrate that the control element 14 also may be rotated in an unhampered manner in the direction of the arrow T into the position shown in FIGS. 4, 7, 16 when no locking groove 4 of the locking sleeve 3 seated on the steering shaft 1 is aligned with the locking bolt 2 in a way to receive the free end 12 of the latter. In such a case the locking bolt 2 arrives at a so-called pre-locked position from which it will be moved farther by the associated helical compression spring 29 in direction toward the steering shaft 1 in order to engage by its end 12 one of the two adjacent locking grooves 4 of the locking sleeve 3 and to assume its locked position as soon as the steering shaft 1 has been rotated in such manner that the locking groove 4 is aligned with the locking bolt 2. Even in its pre-locked position, the locking bolt 2 is locked by the securing pin 30 which then engages a shallower segment 33c of the lateral recess 33 of the locking bolt 2 as shown in FIG. 15. When the locking bolt 2 is axially driven and therefore moved by the force of its helical compression spring 29 out of the pre-locked position of FIG. 15 into the locked position of FIG. 6, the securing pin 30 leaves the flatter segment 33c of the lateral recess 33 of the locking bolt 2 in order to be driven by its helical compression spring 32 into the deeper segment 33a of the recess 33.

Figure 17:
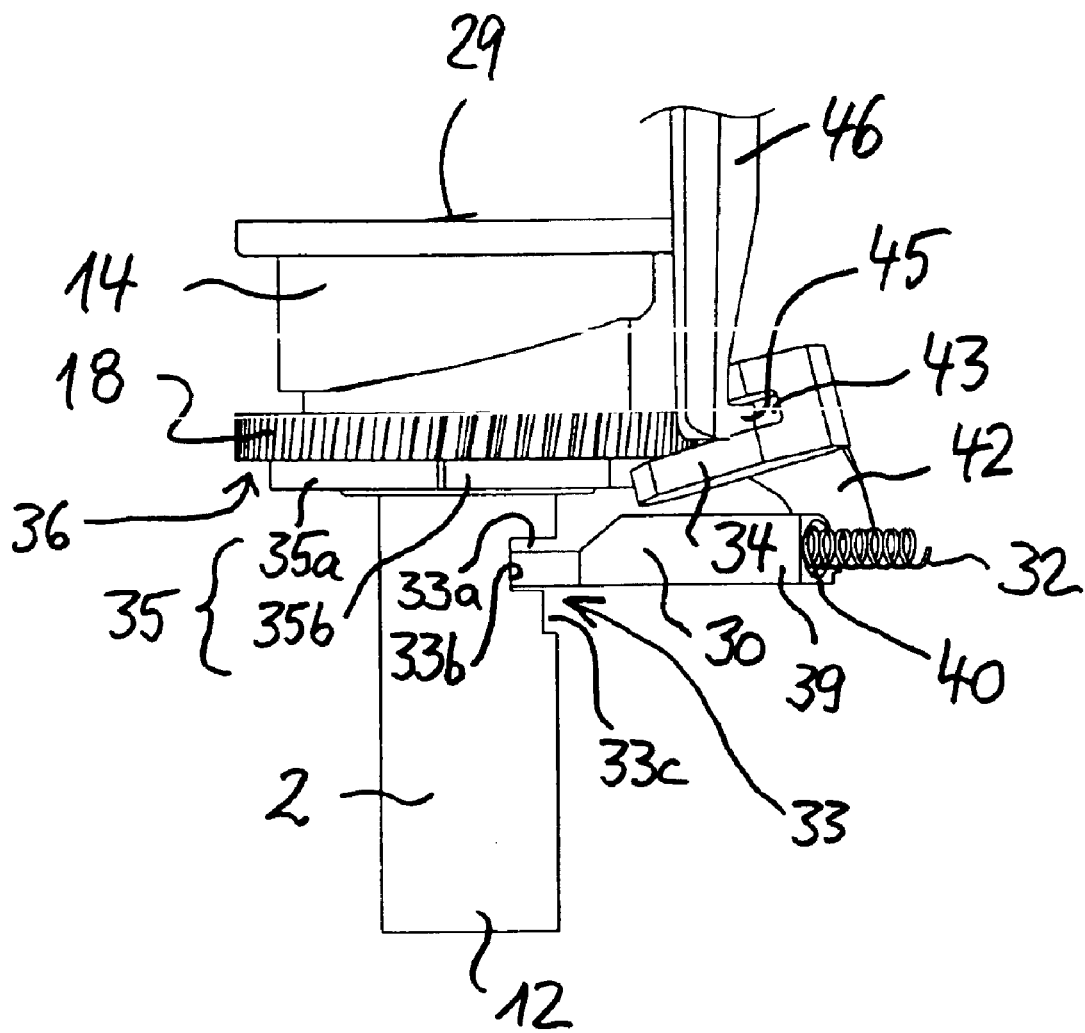
FIG. 17 is an elevation view corresponding to that of FIG. 6 with the steering shaft omitted, and with the housing assembly aperture lid raised.

When the locking bolt 2 is fixed in its locked position by the securing pin 30 and then the sealing lid 9 for the assembly aperture 10 of the housing 6 mounted on the housing 6 is removed by force, the arm 46 of said lid 9 moves the sensing element 34 out of engagement with the securing pin 30, as shown in FIGS. 17, 18, whereby said pin 30 is driven by the helical compression spring 32 as far as and against the end 33b of the deeper segment 33a of the lateral recess 33 of the locking bolt 2 into a position wherein the sensing element 34 can not be brought into engagement again with the securing pin 30 which itself is inaccessible and consequently the securing pin 30 cannot be pulled out of the deeper segment 33a of the lateral recess 33 of the locking bolt 2 and the fixation of said bolt 2 in its locked position cannot be eliminated.

The sensing element 34 is pivoted by the arm 46 of the sealing lid 9 and as a result the lateral arm 42 of the sensing element 34 moves away from the lateral protrusion 44 of the securing pin 30 which in turn is axially moved farther by its helical compression spring 32. As shown clearly in FIG. 18, the lateral arm 42 of the sensing element 34 no longer can be moved behind the lateral protrusion 44 of the securing pin 30 to retract the securing pin 30 by means of the sensing element 34 against the force of the helical compression spring 32 out of the deeper segment 33a of the lateral recess 33 of the locking bolt 2. FIG. 3 shows especially clearly that the securing pin 30 per se is inaccessible. It is offset relative to the sensing element 34 away from the arm 46 of the sealing lid 9 and its protrusion 44 is disposed on the side away from the sensing element 34.

The apparatus shown in FIGS. 19 through 23 for locking a motor-vehicle steering shaft 1 essentially differs from the apparatus shown in FIGS. 1 through 18 only in that the sensing element 34 cooperates in a different way both with the securing pin 30 and with the sealing lid's arm 46. The sensing element 34 running parallel to the securing pin 30 is kept by the free end 47 of the sealing lid's arm 46 and against the force of a helical compression spring 48 resting against the securing pin 30 in order to engage said pin 30 with a tab 49.

The sensing element 34 is designed as a narrow strip and is disposed between the free end 47 of the sealing lid's arm 46 and a longitudinal protrusion 50 of the securing pin 30 which is provided on that side of the securing pin 30 which is away from the steering shaft 1. The tab 49 of the sensing element 34 engages behind that end 51 of the longitudinal protrusion 50 which faces the control surface 35 of the control element 14. On one hand the securing pin 30 biased by the helical compression spring 32 and on the other hand the sensing element 34 resting against the control surface 35 of the control element 14 are jointly longitudinally reciprocable below the free end 47 of the sealing lid's arm 46 between the axial position of FIGS. 19, 20 and the axial position of FIGS. 21, 22 in order to respectively fix the locking bolt 2 in its locked position or to eliminate said fixation, whereby said bolt 2 may be axially driven into its release position.

Figure 19:
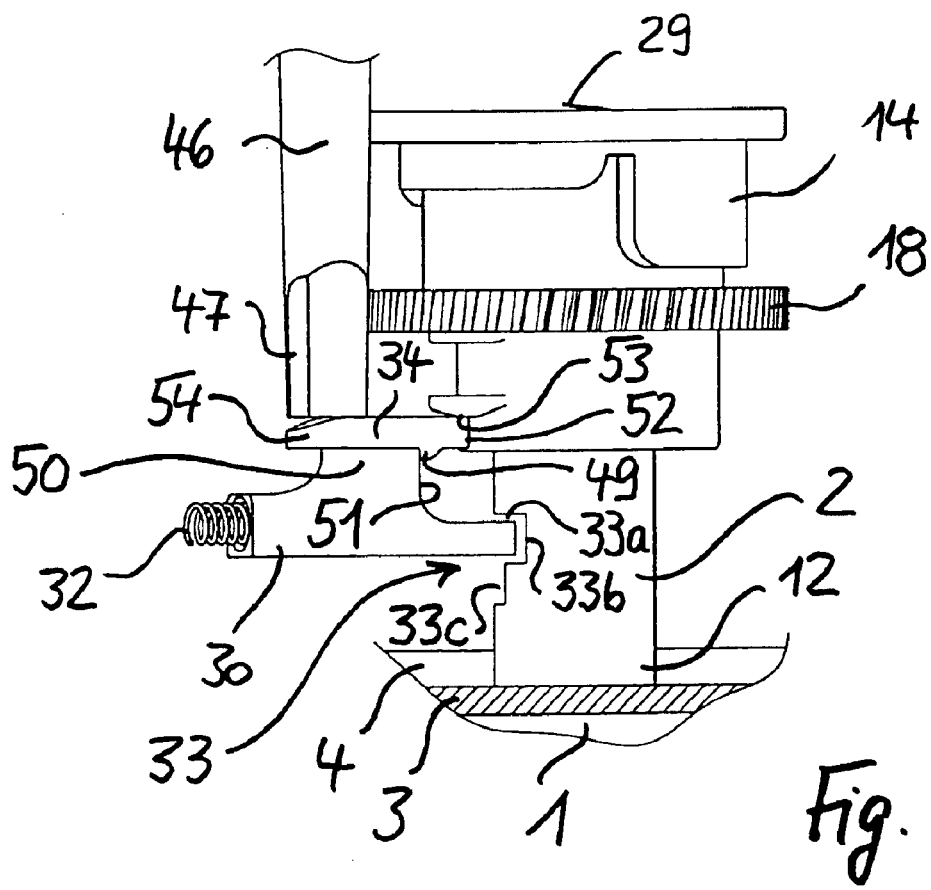
FIG. 19 is an elevation view corresponding to that of FIG. 6 of a second embodiment.
Figure 22:
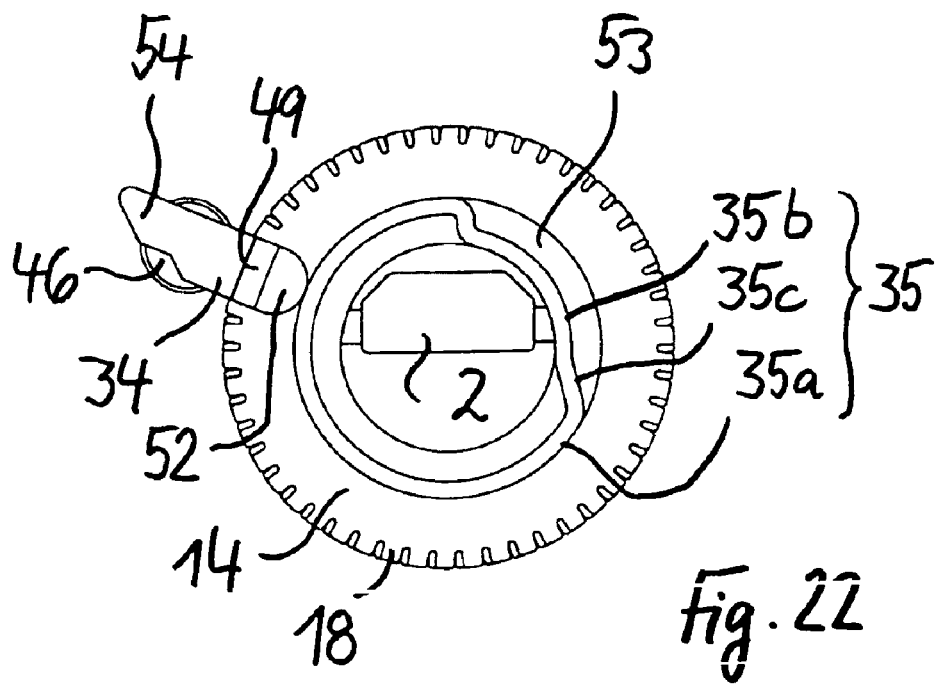
FIG. 22 is a view of the second embodiment corresponding to that of FIG. 12, without the securing pin.
Figure 21:
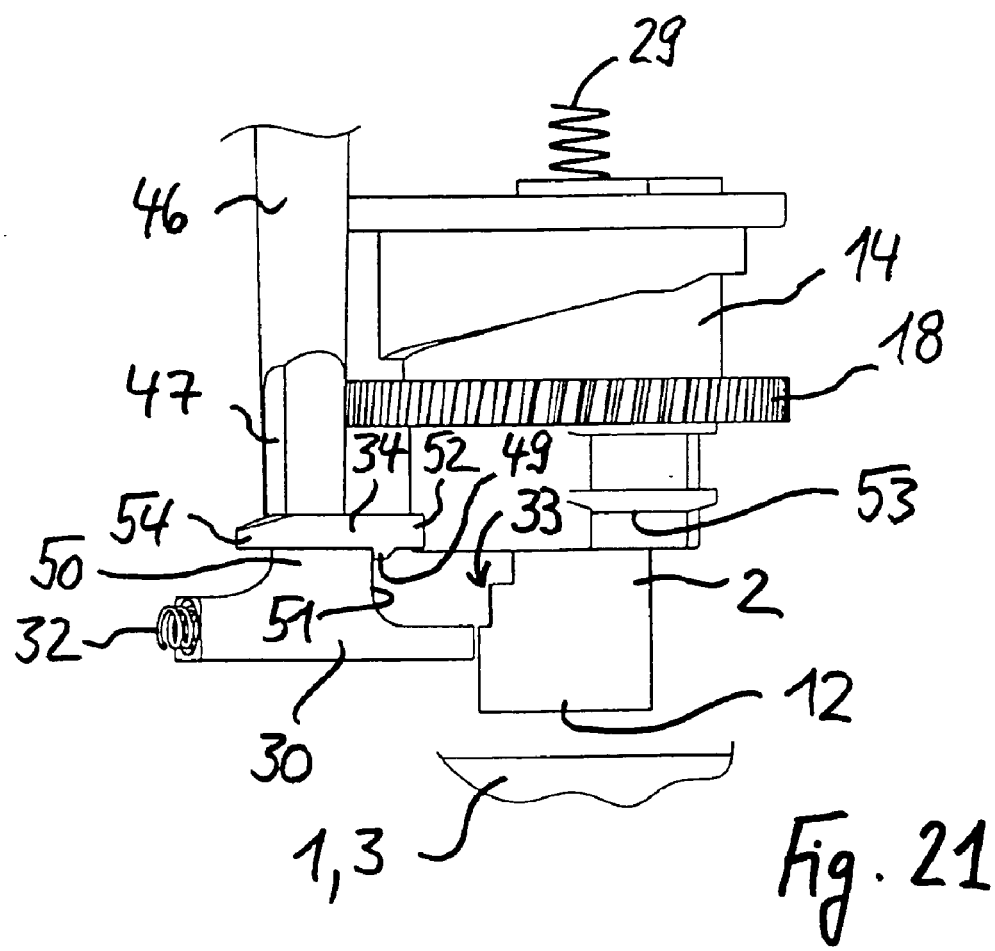
FIG. 21 is an elevation view of the second embodiment corresponding to that of FIG. 11.
Figure 23:
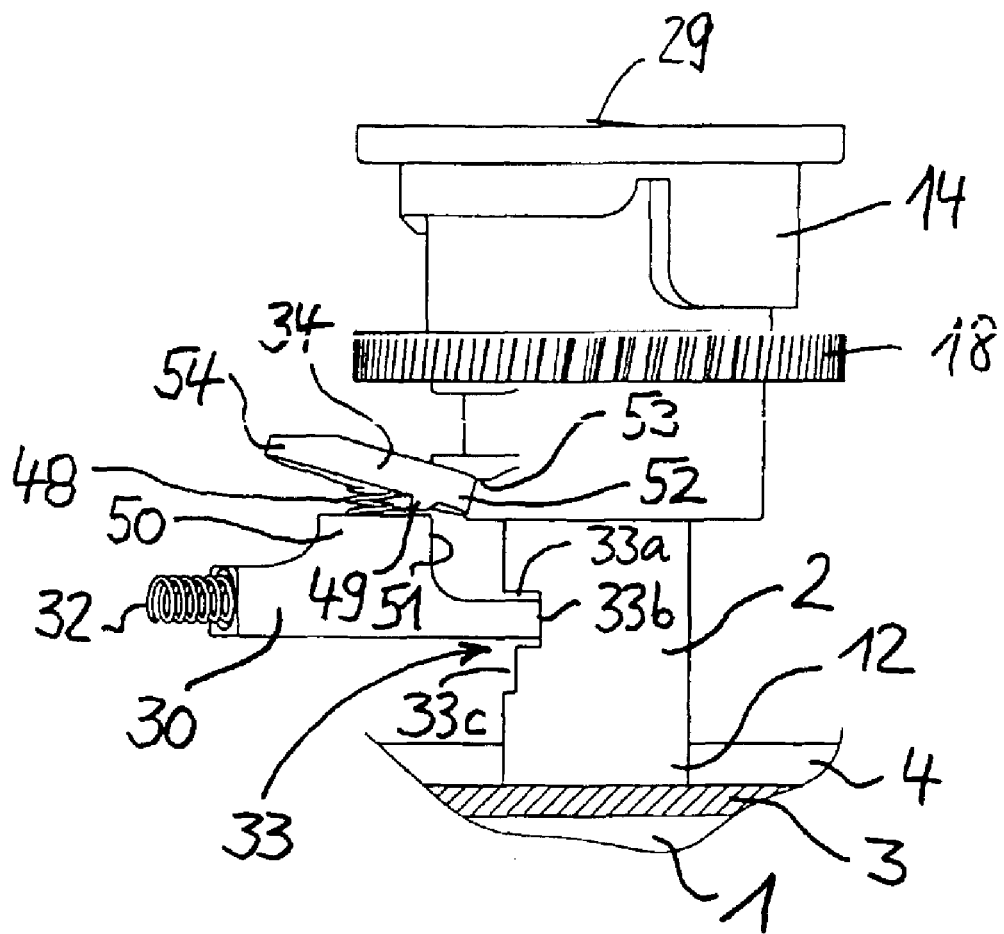
FIG. 23 is an elevation view corresponding to that of FIG. 19, with the lid of the housing assembly aperture removed.

When the securing pin 30 fixes the locking bolt 2 in its locking position and enters the deeper segment 33a of the lateral recess 33 of said bolt 2, then, as shown in FIG. 19, the sensing element 34 projects, by its end 52 resting against the control surface 35 of the control element 14, underneath a radial surface 53 of the control element 14, and, by its other end 54, underneath the free end 47 of the sealing lid's arm 46. If, in such situation, the sealing lid's arm 46 is removed, the helical compression spring 48 mounted in a blind hole of the longitudinal protrusion 50 of the securing pin 30 will tip the sensing element 34 about its end 52 near the control surface 35 away from the securing pin 30, whereby the tab 49 of the sensing element 34 will be disengaged from the end 51—which is near the control surface 35—of the longitudinal protrusion 50 of said pin 30 which then is driven by its helical compression spring 32 fully into the deeper segment 33a of the lateral recess 33 of the locking bolt 2 in order to come to rest against the end 33b of the deeper segment 33a and to pass under and support by means of the longitudinal protrusion 50 the tab 49 of the sensing element 34 as shown in FIG. 23. Thereupon the tab 49 no longer can be made to engage again the longitudinal protrusion 50 of the securing pin 30 in order to retract the said pin 30—which is inaccessible per se—by means of the sensing element 34 out of the deeper segment 33a of the lateral recess 33 of the locking bolt 2 and to eliminate the fixation of the locking bolt 2 in its locked position.

Modifications of the above shown and discussed embodiments are easily feasible. For instance, it is not absolutely necessary that the axis of rotation 15 of the control element 14 runs parallel to the longitudinal axis 7 of the locking bolt 2, instead it may also coincide with said axis 7. Also, the securing pin 30 needs not necessarily be disposed radially to said axis 7. The electric motor 13, instead of acting through the worm 19, also may cooperate by means of a pinion with the control element 14 which engages corresponding outer teeth of the control element 14.

What is claimed is:

1. Apparatus for locking a motor-vehicle steering shaft against rotation comprising:
    a locking bolt which has a longitudinal axis and which is axially reciprocable in a housing between a locked position and release position by a to-and-fro rotatable control element;
    said locking bolt being fixable in the locked position by means of a spring-loaded securing element which is displaceably supported in said housing and which through its spring loading enters a lateral recess of said locking bolt and which, in order to move against its spring-loading out of said recess, cooperates with said control element of the locking bolt;
    said control element being rotatably supported in the housing for rotation about an axis which extends parallel to, or coincides with, the longitudinal axis of the locking bolt;
    said securing element comprising a pin having a longitudinal axis and mounted for axial displacement in the housing;
    said longitudinal axis of said pin extending in a plane perpendicular to the longitudinal axis of the locking bolt;
    said pin engaging under the action of its spring load a control surface of the control element;
    said control surface extending around the axis of rotation of the control element;
    wherein the securing pin cooperates by means of a sensing element with the control surface at the control element; and
    wherein an arm of a sealing lid of an assembly aperture of the housing engages said sensing element in such a manner that when the sealing lid is removed from the assembly aperture, the sensing element is disengaged from the securing pin and the securing pin is driven by its spring loading as far as against the end of the recess of the locking bolt into a position whereat the sensing element no longer is engageable with the securing pin, said securing pin itself being inaccessible.

2. Apparatus as claimed in claim 1, wherein the control element surrounds the locking bolt.

3. Apparatus as claimed in claim 1, wherein the securing pin is disposed between the control element and the steering shaft and the control surface for the securing pin is provided at that end face of the control element facing towards the steering shaft.

4. Apparatus as claimed in claim 1, wherein the control surface for the securing pin is formed on the control element such that, when rotating the control element to axially shift the locking bolt out of the locking position into the release position, the securing pin is first moved out of the recess of the locking bolt.

5. Apparatus as claimed in claim 1, wherein the sensing element is arranged to extend parallel to the securing pin and comprises a lateral arm which engages behind a lateral protrusion of the securing pin and is fitted with a groove running parallel to the securing pin that is arranged to receive the arm of the sealing lid.

6. Apparatus as claimed in claim 1, wherein the sensing element extends parallel to the securing pin and is maintained in engagement against the securing pin by the free end of the arm of the sealing lid against the force of a spring, so that a tab of the sensing element engages behind said securing pin.

7. Apparatus as claimed in claim 1, wherein the assembly aperture of the housing is located on a side of said housing which is located away from the steering shaft.

8. Apparatus as claimed in claim 7, wherein the arm of the sealing lid of the assembly aperture of the housing extends parallel to the locking bolt.

9. Apparatus as claimed in claim 1, including a reversible electric motor drivingly connected to the control element for rotating the control element to and fro.

10. Apparatus as claimed in claim 9, wherein the electric motor cooperates by means of a pinion or a worm with the control element, said pinion or worm engaging outer teeth of the control element.

11. Apparatus for locking a motor-vehicle steering shaft against rotation comprising:
    a locking bolt which has a longitudinal axis and which is axially reciprocable in a housing between a locked position and release position by a to-and-fro rotatable control element;

said locking bolt being fixable in the locked position by means of a spring-loaded securing element which is displaceably supported in said housing and which through its spring loading enters a lateral recess of said locking bolt and which, in order to move against its spring-loading out of said recess, cooperates with said control element of the locking bolt;

said control element being rotatably supported in the housing for rotation about an axis which extends parallel to, or coincides with, the longitudinal axis of the locking bolt;

said securing element comprising a pin having a longitudinal axis and mounted for axial displacement in the housing;

said longitudinal axis of said pin extending in a plane perpendicular to the longitudinal axis of the locking bolt;

said pin engaging under the action of its spring load a control surface of the control element;

said control surface extending around the axis of rotation of the control element, wherein the recess of the locking bolt comprises a deeper segment and a shallower segment to receive the securing pin in the locked position and respectively in a pre-locked position of the locking bolt.

12. Apparatus as claimed in claim 11, wherein the control element surrounds the locking bolt.

13. Apparatus as claimed in claim 11, wherein the securing pin is disposed between the control element and the steering shaft and the control surface for the securing pin is provided at the end face of the control element facing towards the steering shaft.

14. Apparatus as claimed in claim 11, wherein the control surface for the securing pin is formed on the control element such that, when rotating the control element to axially shift the locking bolt out of the locking position into the release position, the securing pin is first moved out of the recess of the locking bolt.

15. Apparatus as claimed in claim 11, including a reversible electric motor drivingly connected to the control element for rotating the control element to and fro.

16. Apparatus as claimed in claim 15, wherein the electric motor cooperates by means of a pinion or a worm with the control element, said pinion or worm engaging outer teeth of the control element.

* * * * *